(12) United States Patent
Hogan (10) Patent No.: US 9,416,848 B2
(45) Date of Patent: Aug. 16, 2016

(54) PIN-ROLLER CHAIN

(71) Applicant: U.S. Tsubaki, Inc, Wheeling, IL (US)

(72) Inventor: Michael Christopher Hogan, Ludlow, MA (US)

(73) Assignee: U.S. Tsubaki, Inc., Wheeling, IL (US)

(*) Notice: Subject to any disclaimer, the term of this patent is extended or adjusted under 35 U.S.C. 154(b) by 0 days.

(21) Appl. No.: 14/871,150

(22) Filed: Sep. 30, 2015

(65) Prior Publication Data

US 2016/0169325 A1 Jun. 16, 2016

Related U.S. Application Data

(63) Continuation of application No. 14/566,135, filed on Dec. 10, 2014, now Pat. No. 9,151,359.

(51) Int. Cl.
*F16G 13/06* (2006.01)
*F16C 33/34* (2006.01)
*F16G 15/12* (2006.01)
*F16C 19/46* (2006.01)

(52) U.S. Cl.
CPC ............... *F16G 15/12* (2013.01); *F16C 19/46* (2013.01); *F16C 33/34* (2013.01)

(58) Field of Classification Search
CPC ..... F16G 13/06; F16G 13/02; B65G 2201/02; B62D 55/26
USPC .......................................... 474/209, 212–215
See application file for complete search history.

(56) References Cited

U.S. PATENT DOCUMENTS

| 501,587 | A | * | 7/1893 | Gleason | F16G 13/06 |
| | | | | | 213/156 |
| 569,632 | A | * | 10/1896 | Garrood | F16G 13/06 |
| | | | | | 474/209 |
| 1,609,618 | A | * | 12/1926 | Gallagher | F16C 33/548 |
| | | | | | 384/578 |
| 2,182,443 | A | | 12/1939 | McAninch | |
| 2,816,453 | A | | 12/1957 | Frank | |
| 4,915,511 | A | | 4/1990 | Kotegawa et al. | |
| 5,437,148 | A | | 8/1995 | Karp | |
| 5,823,686 | A | * | 10/1998 | Murano | F16C 33/34 |
| | | | | | 384/463 |
| 5,829,850 | A | | 11/1998 | Ketting et al. | |
| 6,102,573 | A | * | 8/2000 | Morimoto | F16C 21/00 |
| | | | | | 384/127 |

(Continued)

OTHER PUBLICATIONS

Int'l Search Report and Written Opinion for PCT/USI5/64610 dated Feb. 12, 2016.

*Primary Examiner* — William E Dondero
*Assistant Examiner* — Mark K Buse
(74) *Attorney, Agent, or Firm* — McAndrews Held & Malloy, Ltd.

(57) ABSTRACT

A chain link comprises a first plate, a second plate, a pin which connects the two plates, and a plurality of rolling elements arranged circumferentially around the pin, wherein the plurality of rolling elements are exposed to enable direct contact between them and a tooth of a sprocket when said chain link is mounted to said sprocket. The plurality of rolling elements may be arranged to roll along a surface of the pin. The plurality of rolling elements may be arranged to roll along a surface of a tooth of a sprocket when the chain link is mounted to the sprocket.

7 Claims, 11 Drawing Sheets

(56) References Cited

U.S. PATENT DOCUMENTS

| | | | | |
|---|---|---|---|---|
| 6,367,982 B1* | 4/2002 | Doi | ................. | F16C 19/40 384/463 |
| 6,382,742 B1 | 5/2002 | Hasselbusch et al. | | |
| 6,685,588 B2* | 2/2004 | Doi | ................. | F16C 33/6696 384/907.1 |
| 6,742,935 B2* | 6/2004 | Saji | ................. | F16C 19/50 384/127 |
| 6,855,080 B2* | 2/2005 | Kanehira | ................. | F16G 13/06 384/564 |
| 7,347,513 B2 | 3/2008 | Johannsen et al. | | |
| 7,437,870 B2* | 10/2008 | Wu | ................. | F16G 13/06 474/206 |
| 7,914,409 B2 | 3/2011 | Aoki et al. | | |
| 7,972,233 B2 | 7/2011 | Fujiwara et al. | | |
| 9,004,269 B2* | 4/2015 | Ueno | ................. | B65G 17/38 198/779 |
| 9,151,359 B1* | 10/2015 | Hogan | ................. | F16G 13/06 |
| 2002/0110297 A1 | 8/2002 | Saji | | |
| 2002/0132690 A1 | 9/2002 | Suzuki et al. | | |
| 2002/0173392 A1* | 11/2002 | Doi | ................. | F16C 33/6696 474/209 |
| 2003/0032511 A1* | 2/2003 | Kanehira | ................. | F16G 13/06 474/209 |
| 2003/0192299 A1 | 10/2003 | Kaga et al. | | |
| 2005/0090348 A1 | 4/2005 | Tohara | | |
| 2008/0132368 A1 | 6/2008 | Wu | | |
| 2008/0234086 A1* | 9/2008 | Fujiwara | ................. | F16C 33/34 474/209 |
| 2008/0287237 A1 | 11/2008 | Aoki et al. | | |
| 2012/0181148 A1 | 7/2012 | Ueno et al. | | |
| 2014/0216901 A1 | 8/2014 | Huang et al. | | |
| 2015/0080161 A1* | 3/2015 | Nishizawa | ................. | F16G 13/06 474/209 |

\* cited by examiner

PIN-ROLLER CHAIN

CLAIM OF PRIORITY

This patent application is a continuation of U.S. patent application Ser. No. 14/566,135 filed on Dec. 10, 2014, which is hereby incorporated herein by reference in its entirety.

BACKGROUND

Limitations and disadvantages of conventional chains and methods of operation thereof will become apparent to one of skill in the art, through comparison of such approaches with some aspects of the present method and system set forth in the remainder of this disclosure with reference to the drawings.

BRIEF SUMMARY

A chain and methods of operating and fabricating such a chain, substantially as illustrated by and/or described in connection with at least one of the figures, as set forth more completely in the claims.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. Unless clearly indicated otherwise, letters in reference designators are simply for graphical clarity and items having the same reference designator number but different letters may be referred to interchangeable by dropping the letter (e.g., "102" may refer to either of "102a" and "102b").

Figure 1:
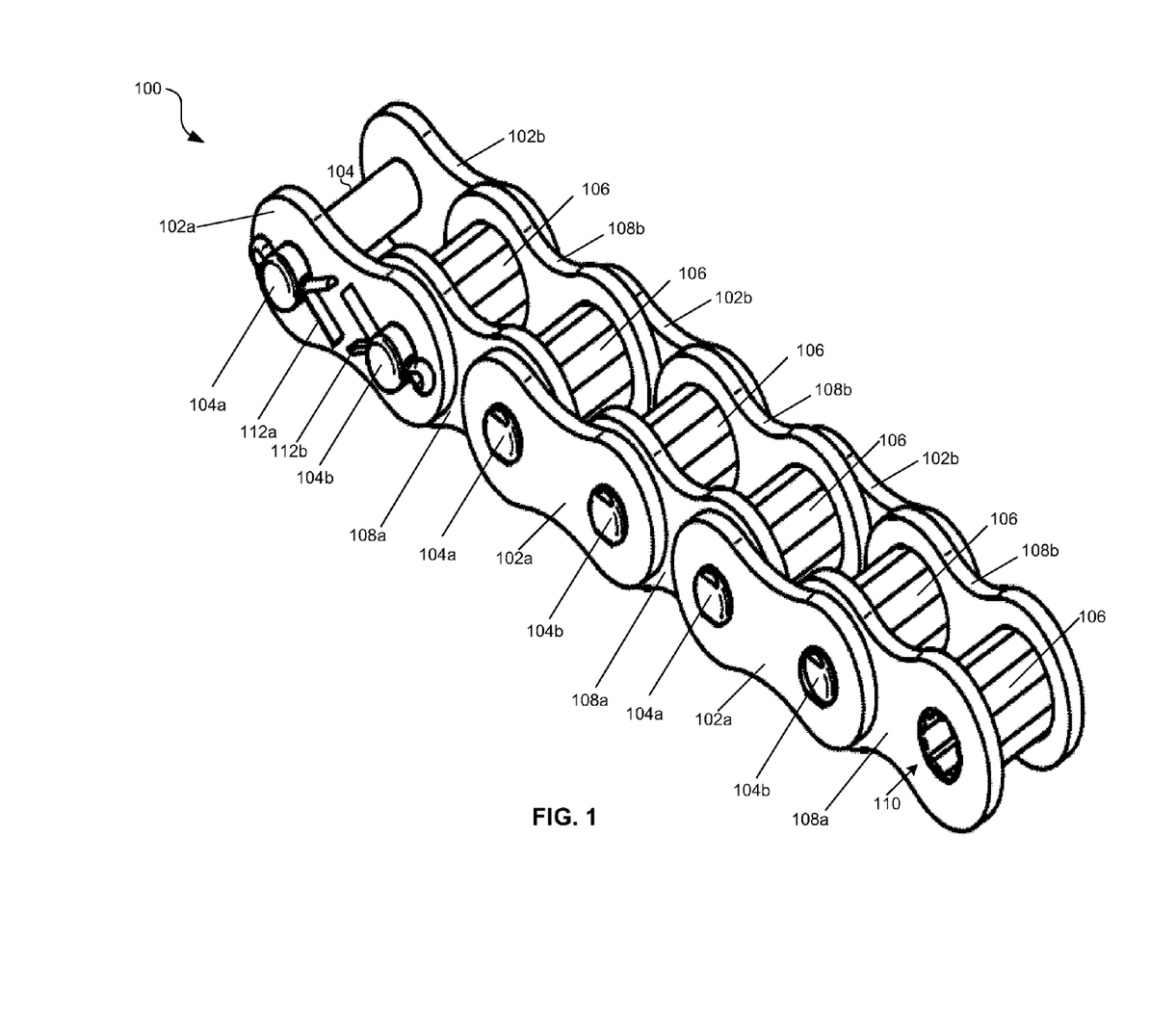
FIG. 1 shows a perspective view of a pin-roller chain in accordance with aspects of this disclosure.

FIG. 1 shows a perspective view of a pin-roller chain in accordance with aspects of this disclosure. The chain 100 comprises: a plurality of pairs of outer plates 102a and 102b, each of which is are called out; a plurality of pins 104a and 104b, each of which is called out; a plurality of rolling elements 106, one of which is called out in each group of rolling elements around each pin 104; a plurality of pairs of inner plates 108, each of which is called out, a plurality of holes 110, of which one is called out and the others are obscured by the pins 104a and 104b passing through them; and retaining clips 112a and 112b which retain their respective pins 104a and 104b but are removable to enable pulling their respective pins 104a and 104b out of their respective holes 110 (e.g., for adjusting the length of the chain, installing the chain on a sprocket, etc.). Other pins that do not need to be removed may be rivet pins rather than being held in place by retaining clips such as 112a and 112b. In an example implementation, the chain 100 is dimensionally interchangeable with ASME/ANSI chains such that it may be retrofit into existing systems without any need to change existing sprockets, etc. One advantage of the chain 100 over conventional systems is the ease with which the chain 100 may be cleaned and lubricated.

Figure 2:
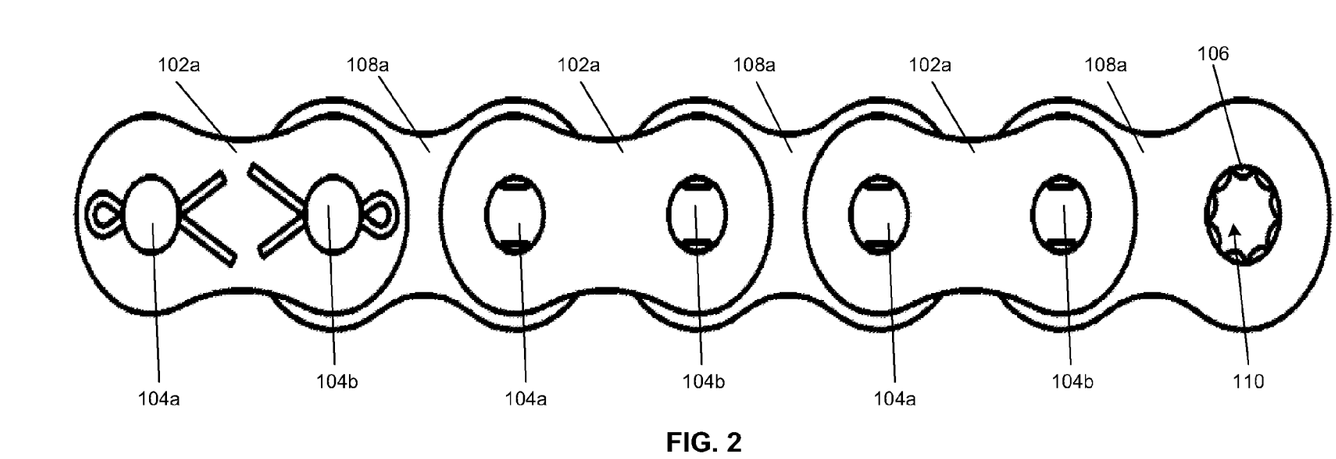
FIG. 2 shows a side view of the pin roller chain of FIG. 1.

FIG. 2 shows a side view of the pin roller chain of FIG. 1. More visible in FIG. 2 than FIG. 1 is that, in an example implementation, the rolling elements 106 may partially overlap the edge of the hole 110 such that the diameter of hole 110 may be greater than $D_{104}$ but less than the $D_{104}+2\times D_{106}$, where $D_{104}$ is the diameter of the pin 104 and $D_{106}$ is the diameter of a rolling element 106.

Figure 3:
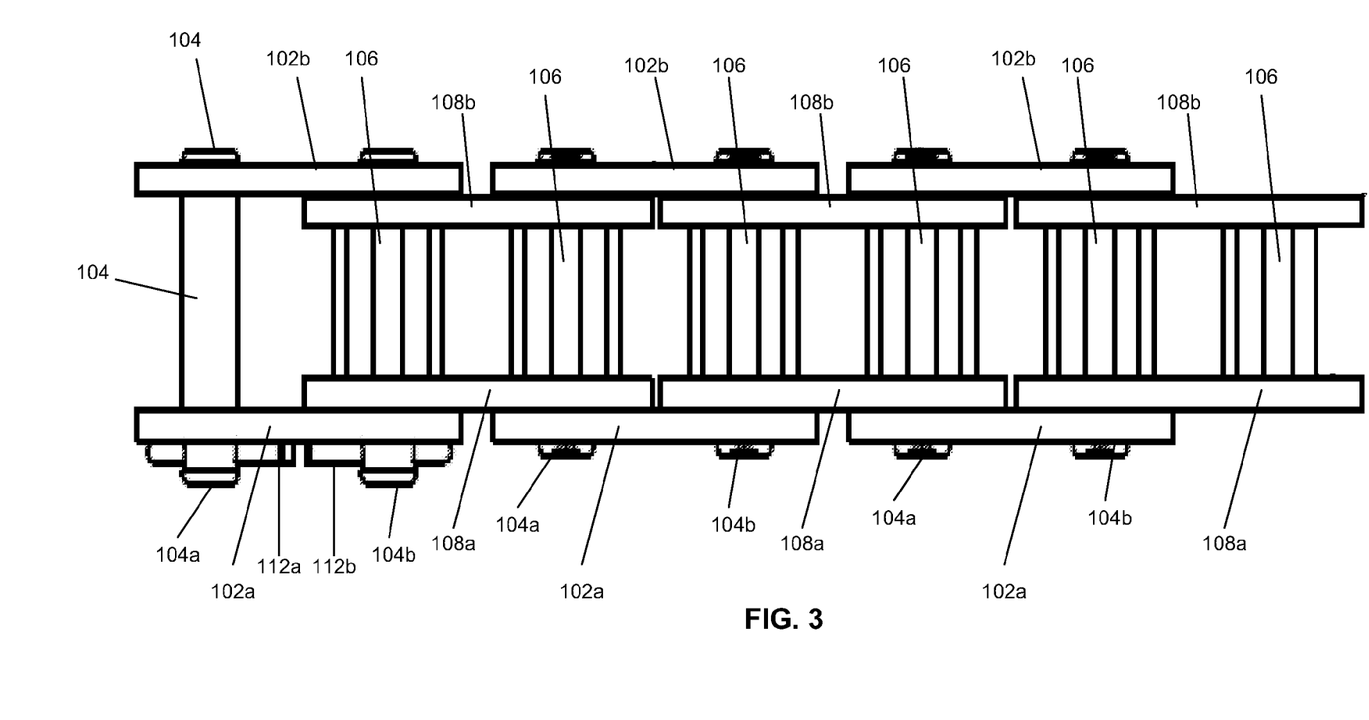
FIG. 3 shows a top view of the pin roller chain of FIG. 1.

FIG. 3 shows a top view of the pin roller chain of FIG. 1. The same elements called out in FIG. 1 are called out in FIG. 3.

Figure 4:
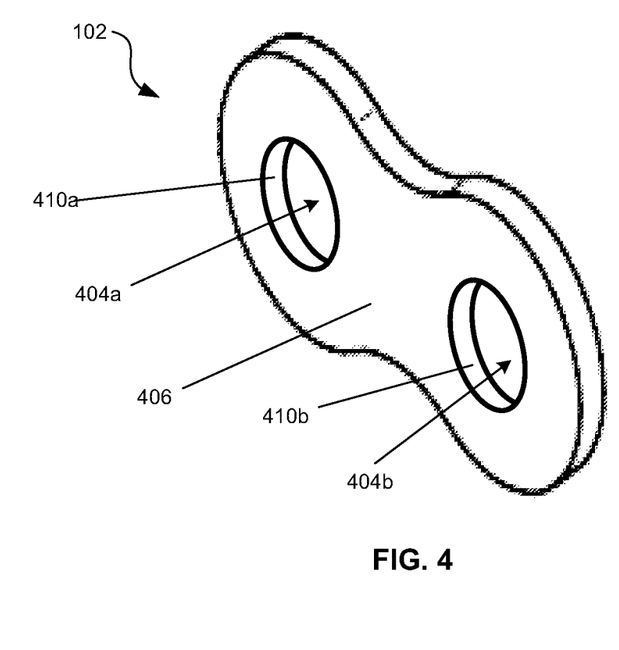
FIG. 4 shows a perspective view of an outer plate of the pin-roller chain of FIG. 1.

FIG. 4 shows a perspective view of an outer plate of the pin-roller chain of FIG. 1. The outer plate 102 comprises a first surface 406, a second surface opposite the first surface (not visible in FIG. 4), holes 404a and 404b, and surfaces 410a and 410b which are the walls of the holes 404a and 404b, respectively.

Figure 5A:
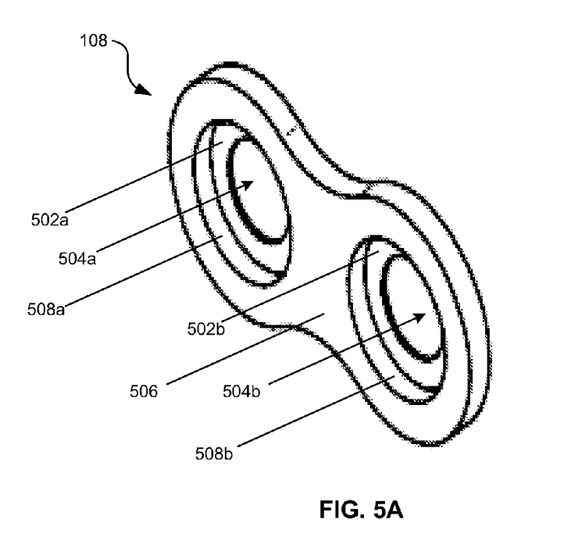
FIG. 5A shows a perspective view of an inner plate of the pin-roller chain of FIG. 1.

FIG. 5A shows a perspective view of an inner plate of the pin-roller chain of FIG. 1. The inner plate 108 comprises holes 504a and 504b, a first surface 506, a second surface opposite the first surface (not visible in FIG. 5A), third and fourth surfaces 502a and 502b that are also opposite the second surface but recessed from surface 506, and fifth and sixth surfaces which are the walls of the cylindrical holes 504a and 504b, respectively.

Figure 5B:
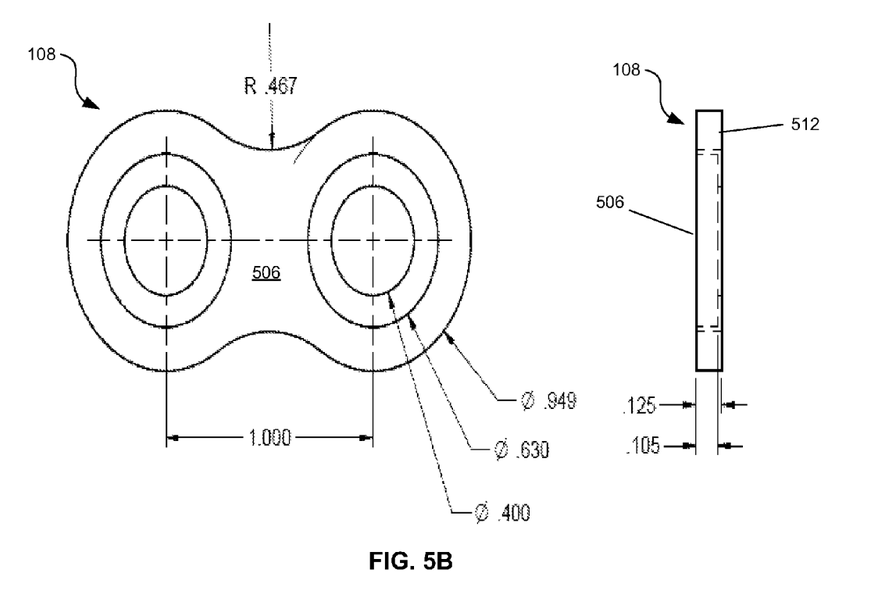
FIG. 5B shows a side view of an inner plate of the pin-roller chain of FIG. 1.

FIG. 5B shows a side view of an inner plate of the pin-roller chain of FIG. 1. FIG. 5B illustrates measurements of an example implementation of the inner plate 108. For the example implementation, the holes 504a and 504b have a diameter of 400 mils, the recessed third and fourth surfaces 502a and 502b have an outer diameter of 630 mils (and an inner diameter equal to the diameter of the holes 504a and 504b), the two holes are separated by 1 inch on center, the thickness of the inner plate 108 is 125 mils, and the height of the fifth and sixth surfaces is 105 mils (leaving a thickness of 20 mils for the third and fourth surfaces 502a and 502b). Other implementations may of course have different dimensions.

When the chain is assembled, the holes 504a and 404a (FIG. 4) align to form a hole 110a and the holes 504b and 404b (FIG. 4) align to form a hole 110b.

Figure 6A:
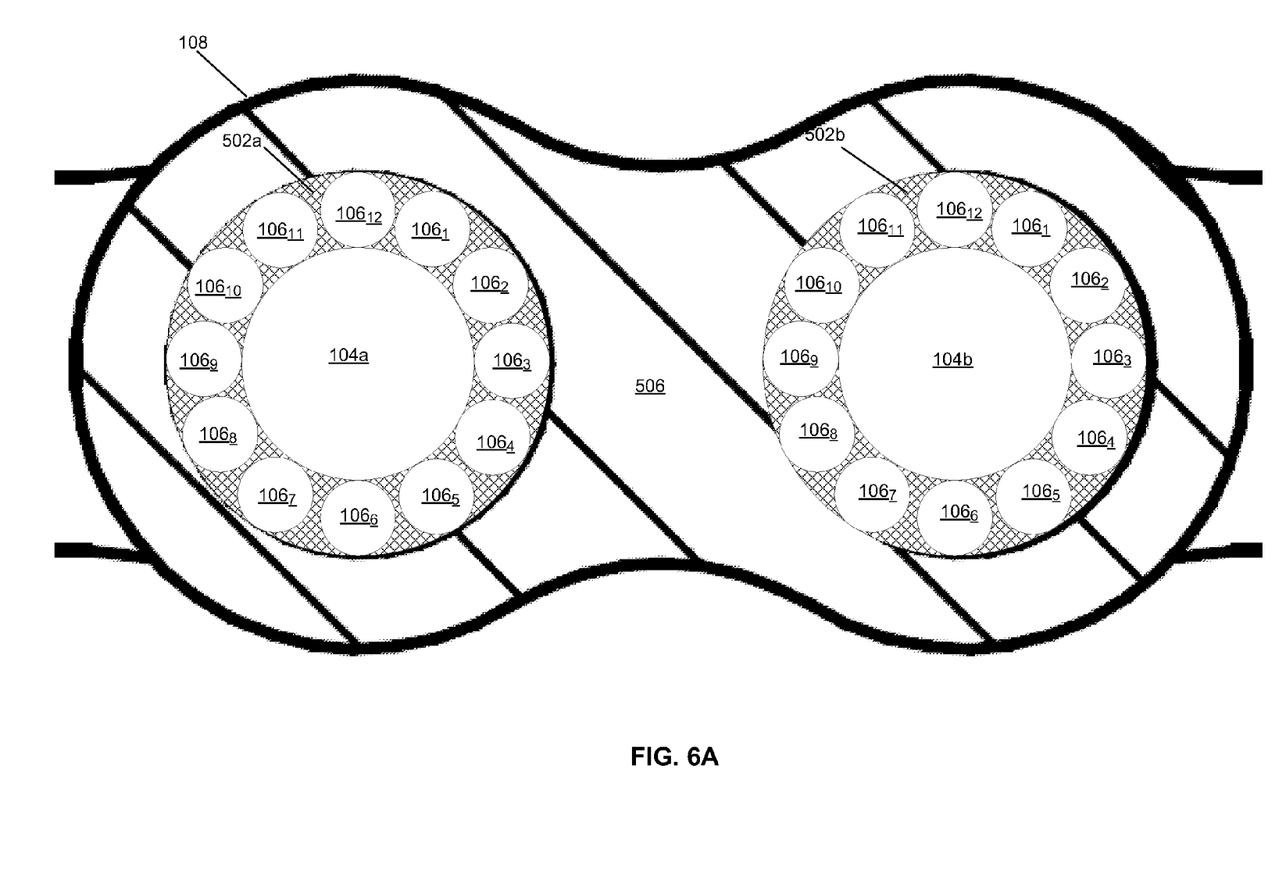
FIG. 6A shows a cross-section of a portion of the chain of FIG. 1.
Figure 6B:
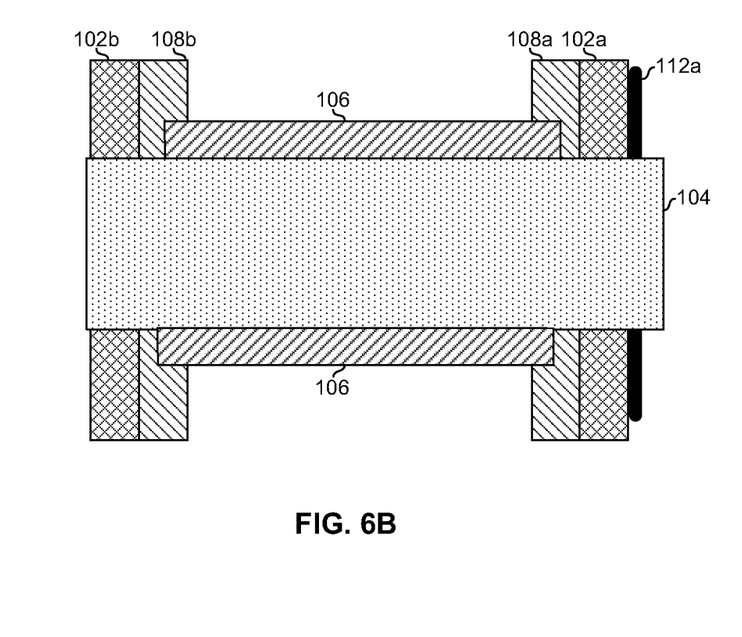
FIG. 6B shows a cross-section of a portion of the chain of FIG. 1 along an axis perpendicular to the view of FIG. 6A.

FIG. 6 shows a cross section of a portion of the chain of FIG. 1. Shown is the surface 506 of an inner plate 108, cross-sections of the pins 104a and 104b, surfaces 502a and 502b of the inner plate 108 (filled with cross-hatching), and cross sections of the rolling elements 106 (in the example implementation shown, there are twelve rolling elements 106 around each of the pins 104. Other implementations may of course have different numbers of rolling elements, which may vary with chain size).

Figure 7:
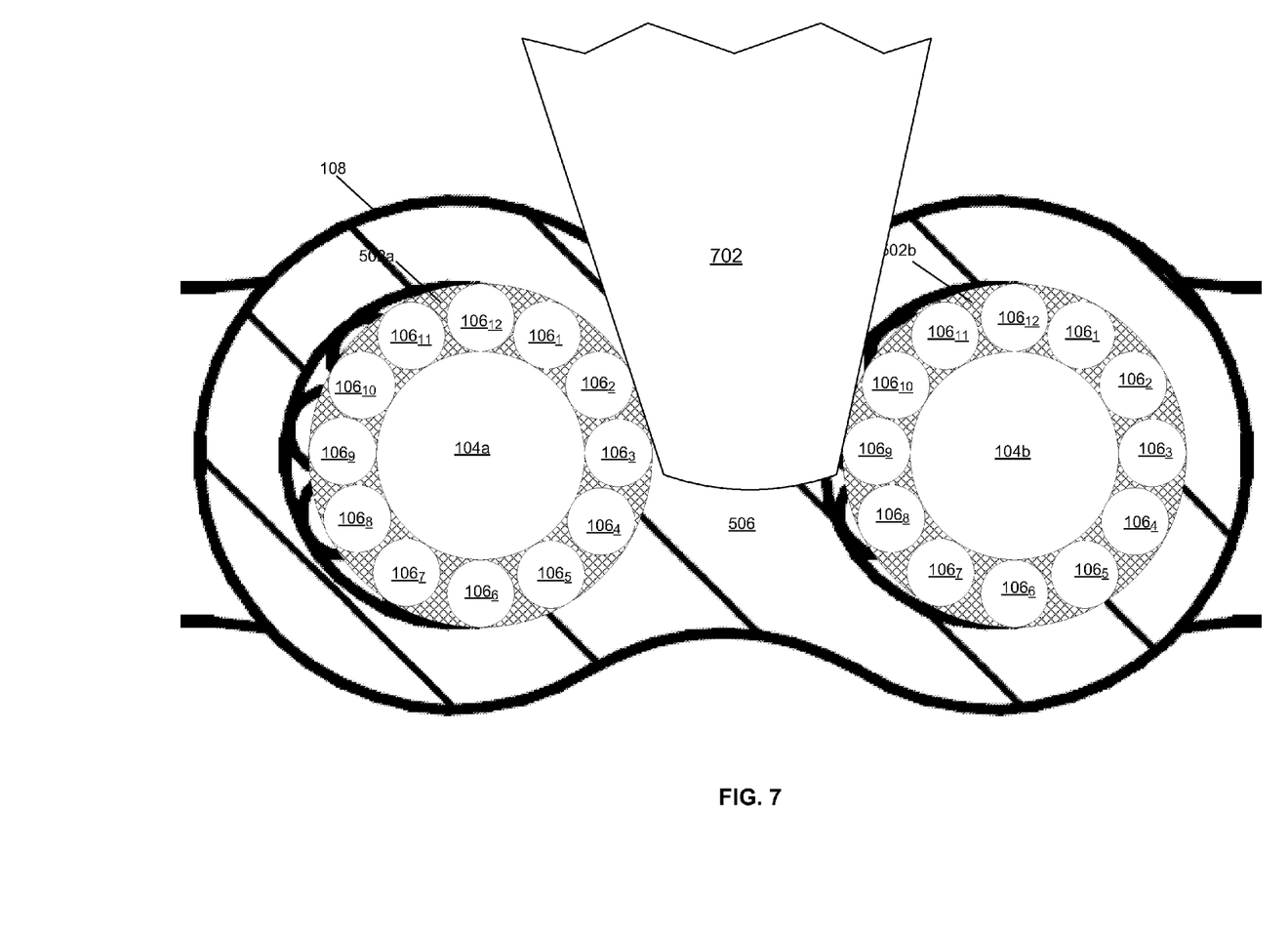
FIG. 7 shows the cross-section of FIG. 6 with the chain engaged with a sprocket.

FIG. 7 shows the cross-section of FIG. 6 with the chain engaged with a sprocket. As shown, when the chain link is engaged with a sprocket, the tooth 702 of the sprocket may directly contact one or more of the rolling elements 106. In this regard, "direct contact" refers to the fact that there is no sheathing, or bushing, or any other mechanical component of the chain positioned between the sprocket tooth 702 and the surface of the rolling element 106. Paint or lubricant on either or both of the rolling element 106 and tooth 702 still constitutes "direct contact."

In operation, as the chain conveys, or is conveyed by, the tooth 702, the one or more of the rolling elements may spin in place and/or roll. For example, centering a hypothetical clock on the pin 104, then rolling elements $106_1$-$106_{12}$ may be referred to as being at 1:00 o'clock, 2 o'clock, . . . 12:00 o'clock, respectively. When a rolling element 106 "spins" it stays at its position on the clock (e.g., $106_2$ spins but stays positioned at 2:00 o'clock). When a rolling element 106 "rolls" it changes its position on the clock (e.g., $106_2$ may roll from 2:00 o'clock to 3:00 o'clock). Depending on how much space is between the rolling elements 106, a roll of one rolling element 106 may or may not necessitate a roll of other rolling elements 106. The rolling elements 106 may also slide from one position on the clock to another, but the chain may be designed (e.g., through appropriate choice of materials/friction coefficients of the surfaces of the pins 104, rolling elements 106, tooth 702, and surfaces 502 and 508) to minimize such sliding because sliding creates much more friction and wear on the chain. Similarly, "spin" as described here, is in effect sliding, which creates friction and wear on the chain. Accordingly, the rolling elements 106, pin 104, and/or sprockets that interface with the chain may be designed to promote rolling (i.e., the rolling elements 106 roll along both the pin 104 and the sprocket) rather than spin or slide. This may comprise, for example, using particular materials, surface textures, and/or the like (on the rolling elements 106, the pin 104, and/or on the sprocket) that promote rolling rather than spinning or sliding.

Figure 8A:
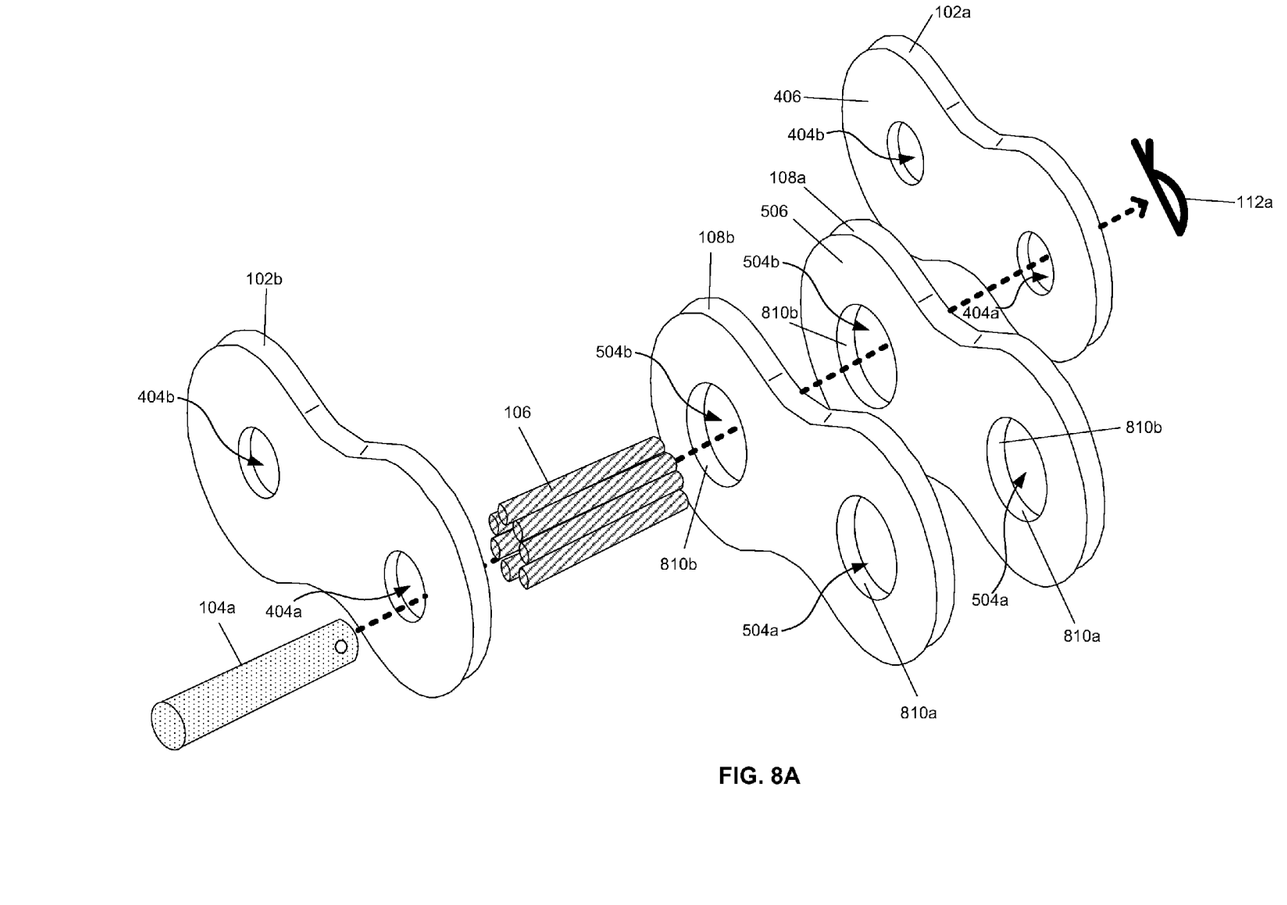
FIG. 8A shows an exploded view of an alternate embodiment in which the rolling elements pass through the holes of the inner plates.

FIG. 8A shows an exploded view of an alternate embodiment in which the rolling elements pass through the holes of the inner plates. In FIG. 8A, rather than having a recessed region defined by surfaces 502 and 508, the diameter of the holes 504 in inner plates 108 is large enough for the pin 104 and group of rolling elements 106 to pass through. The diameter of the holes 404 in the outer plates 102, on the other hand, are smaller such that the pin 104 may pass through but group of rolling elements 106. Thus, the surfaces 506 of the plates 102 and the surfaces 810 of the inner plates 108 hold the rolling elements in place similar to how the surfaces 502 and 508 of the inner plates 108 held the rolling elements in place in the embodiment of FIGS. 5A-7. One consequence of the embodiment of FIG. 8A is the need to hold the inner plates 108a and 108b in place so that they do not migrate into the path of the sprocket during use of the chain. (In the embodiment of FIGS. 5-7 this was achieved by the surfaces 502a and 502b butting up against the ends of the rolling elements 106.) In an example embodiment, the rolling elements may be shaped to prevent the inner plates 108a and 108b from sliding over them and interference with the sprocket. For example, as shown in FIG. 8B, the rolling elements 106b may have a stepped or graduated radius (such as the example rolling element 106e of FIG. 9) such that a portion of the rolling element 106 having a smaller radius fits into the holes 404 and portion of the rolling element 106 having a larger radius does not fit into the holes 404 and thus prevents the inner plates 108a and 108b from sliding over the rolling elements 106 and interfering with the sprocket.

Figure 8B:
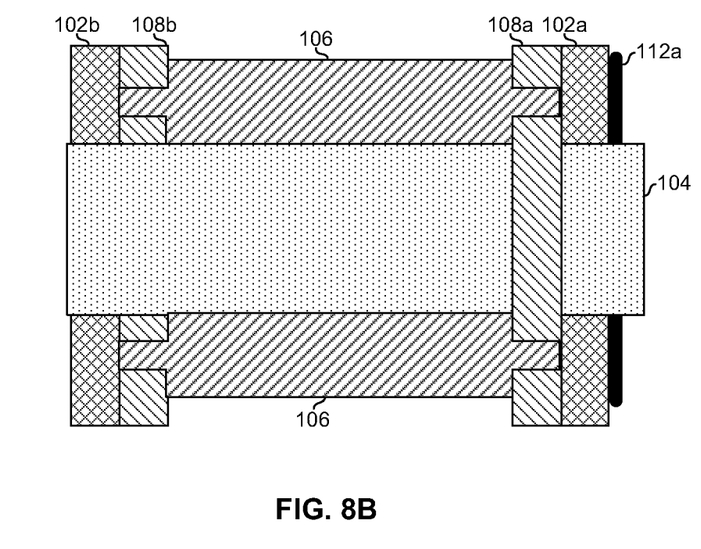
FIG. 8B shows a cross-sectional view of an alternate embodiment in which the rolling elements pass through the holes of the inner plates.

FIG. 8B shows a cross-sectional view of the embodiment shown in FIG. 8A.

Figure 9:
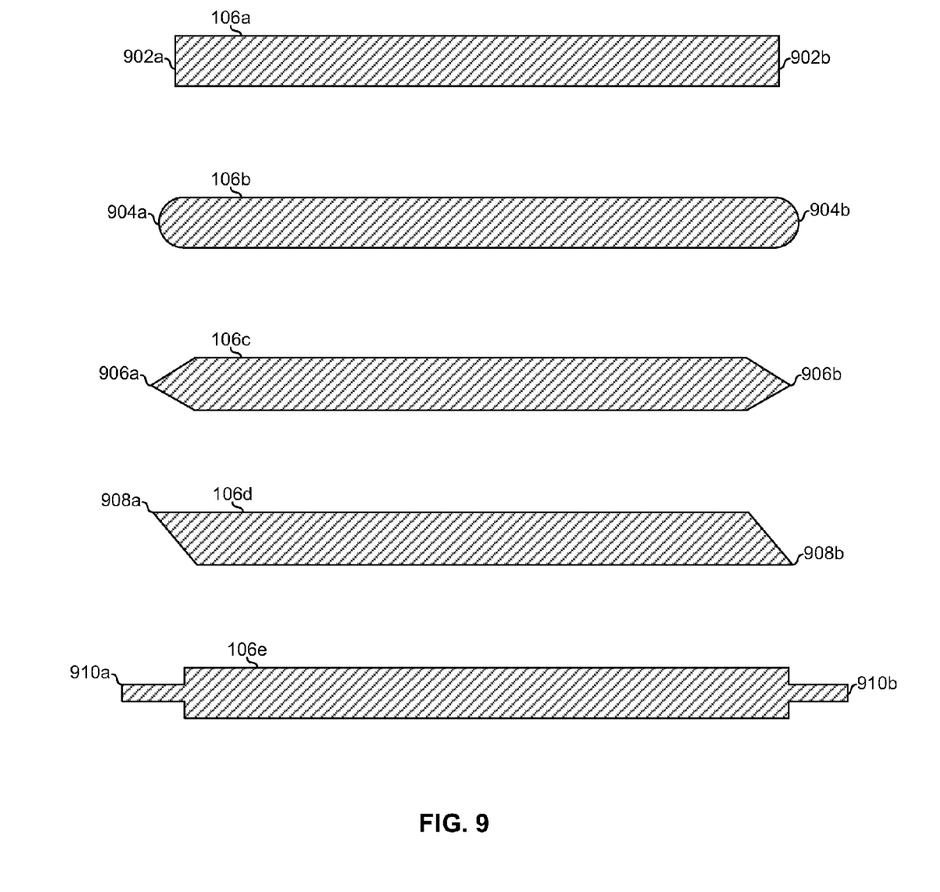
FIG. 9 shows various shapes of rolling elements which may be used in various embodiments of this disclosure.

FIG. 9 shows various shapes of rolling elements which may be used in various embodiments of this disclosure. The rolling element 106a comprises flat ends 902, the rolling element 106b comprises rounded ends 904, the rolling element 106c comprises centered, pointed ends 906, the rolling element 106d comprises off-center pointed ends 908, and the rolling element 106e comprises flat ends but with a smaller radius than the center of the rolling element 106e. The flat ends 902 may be simplest/least expensive to manufacture. The rounded ends may be more costly to manufacture but may reduce friction (compared to ends 902) between the rolling element 106b and the surface 502 (FIG. 5A) or 506 (FIG. 8A). Similarly, the pointed ends 906 and 908 may be more costly to manufacture than flat ends 902 but may reduce friction (compared to ends 902) between the rolling element 106c and the surface 502 (FIG. 5A) or 506 (FIG. 8A). The ends 910 may be more costly to manufacture but may reduce friction (compared to ends 902) between the rolling element 106b and the surface 502 (FIG. 5A) or 506 (FIG. 8A), and may also serve to prevent migration of the inner plates 108a and 108b in an embodiment such as the one in FIGS. 8A and 8B.

In accordance with an example implementation of this disclosure, a chain link comprises a first plate (e.g., 108a) having a first hole (e.g., 504a) in it, a second plate (e.g., 108b) having a second hole (e.g., 504b) in it, a pin (e.g., 104a) which passes through the first hole and the second hole, and a plurality of rolling elements (e.g., 106) arranged circumferentially around the pin, wherein when the chain link is engaged with a tooth (e.g., 702) of a sprocket, the tooth directly contacts one or more of the plurality of rolling elements. The plurality of rolling elements may roll along a surface of the tooth as the chain link conveys, or is conveyed by, the tooth. One or more of the plurality of rolling elements may roll along a surface of the pin as the chain link conveys, or is conveyed by, the tooth. The chain link may comprise a third plate (e.g., 102a) and a fourth plate (e.g., 102b). The length of each of the rolling elements may be greater than a distance between an inner surface (e.g., 506) of the first plate and an inner surface (e.g., 506) of the second plate. The length of each of the rolling elements may be shorter than, or equal to, a distance between an inner surface (e.g., 406) of the third plate and an inner surface (e.g., 406) of the fourth plate.

In accordance with an example implementation of this disclosure, a chain link comprises: a first plate (e.g., 108a) having a first hole (e.g., 504a) in it and having a first annular recessed region (e.g., having surface 502a and wall 508a) surrounding the first hole; a second plate (e.g., 108b) having a second hole (e.g., 504a) in it and having a second annular recessed region (e.g., having surface 502a and wall 508a) surrounding the second hole; a pin (e.g., 104a) which passes through the first hole and the second hole; and a plurality of rolling elements (e.g., 106) arranged circumferentially around the pin. A first end of each the rolling elements may extend into the first annular recessed region and a second end of each of the rolling elements may extend into the second annular recessed region. An inner diameter of the first annular recessed region may be the diameter of the first hole, and an outer diameter of the first annular recessed region may be approximately, but slightly larger, than the diameter of the pin plus twice the diameter of one of the rolling elements.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A chain link comprising:
    a first plate having a first annular recessed region;
    a second plate having a second annular recessed region;
    a pin which connects said first plate and said second plate; and
    a plurality of rolling elements arranged circumferentially around said pin, wherein:
        a first end of each said rolling elements extends into said first annular recessed region and a second end of each of said rolling elements extends into said second annular recessed region;
    said first and second annular recessed regions are such that said plurality of rolling elements are free to slide and/or roll along said first and second annular recessed regions such that they are free to travel circumferentially around said pin; and
    said plurality of rolling elements are exposed to enable direct contact between one or more of said plurality of rolling elements and a tooth of a sprocket at any given time when said chain link is in contact with said sprocket.

2. The chain link of claim 1, wherein said plurality of rolling elements are arranged to roll along a surface of said tooth of said sprocket when said chain link is in contact with said sprocket.

3. The chain link of claim 1, comprising a third plate and a fourth plate.

4. The chain link of claim 3, wherein a length of each of said rolling elements is:
    greater than a distance between an inner surface of said first plate and an inner surface of said second plate; and
    shorter than, or equal to, a distance between an inner surface of said third plate and an inner surface of said fourth plate.

5. The chain link of claim 1, wherein said rolling elements are cylindrical with flat ends.

6. The chain link of claim 1, wherein said rolling elements are cylindrical with rounded ends.

7. The chain link of claim 1, wherein said rolling elements are cylindrical with pointed ends.

* * * * *